United States Patent [19]
Fukushima et al.

[11] Patent Number: 5,789,718
[45] Date of Patent: Aug. 4, 1998

[54] MASH SEAM WELDING PROCESS AND MASH SEAM WELDING APPARATUS

[75] Inventors: Toshihiro Fukushima, Chiryu; Masaki Tanzawa, Toyota, both of Japan

[73] Assignee: Toyota Jidosha Kabushiki Kaisha, Japan

[21] Appl. No.: 732,394

[22] PCT Filed: Feb. 23, 1996

[86] PCT No.: PCT/JP96/00410

§ 371 Date: Dec. 24, 1996

§ 102(e) Date: Dec. 24, 1996

[87] PCT Pub. No.: WO96/26037

PCT Pub. Date: Aug. 29, 1996

[30] Foreign Application Priority Data

Feb. 23, 1995 [JP] Japan .................. 7-059786

[51] Int. Cl.$^6$ .................. B23K 11/06
[52] U.S. Cl. .................. 219/83; 219/81; 219/117.1
[58] Field of Search .................. 219/64, 78.01, 219/78.16, 81, 83, 102, 105, 117.1

[56] References Cited

U.S. PATENT DOCUMENTS

| | | | |
|---|---|---|---|
| 4,568,812 | 2/1986 | Panknin et al. | 219/64 |
| 5,042,711 | 8/1991 | Iskenderian et al. | 219/102 |
| 5,131,581 | 7/1992 | Geiermann | 219/81 |
| 5,290,990 | 3/1994 | Bischofberger et al. | 219/81 |
| 5,343,010 | 8/1994 | Urech | 219/83 |

FOREIGN PATENT DOCUMENTS

| | | |
|---|---|---|
| 63-63575 | 3/1988 | Japan . |
| 3-31074 | 2/1991 | Japan . |
| 3-60873 | 3/1991 | Japan . |
| 3-60874 | 3/1991 | Japan . |
| 5-69151 | 3/1993 | Japan . |
| 5-92273 | 4/1993 | Japan . |
| 6-71452 | 3/1994 | Japan . |

*Primary Examiner*—Stuart N. Hecker
*Attorney, Agent, or Firm*—Finnegan, Henderson, Farabow, Garrett & Dunner, L.L.P.

[57] ABSTRACT

Mash seam welding process and apparatus, wherein two plate-like workpieces having different thickness values are fed and guided by a guiding device such that a length $W_H$ of contact of the thick plate-like workpiece with one of two roller electrodes is smaller than a length $W_M$ of contact of the thin plate-like workpiece with the other roller electrode. In this arrangement, the amount of mashing of the thick plate-like workpiece by the roller electrode is made larger than that of the thin plate-like workpiece by the other roller electrode, so that an interface of the two plate-like workpieces is positioned intermediate between the pair of roller electrodes, whereby a weld nugget formed intermediate between the roller electrodes extends across the interface, permitting the weld to have a sufficient strength owing to a nugget ratio, which is a ratio of a width dimension $W_N$ of the weld nugget in the direction of the interface to a width dimension $W_G$ of the interface.

15 Claims, 13 Drawing Sheets

| PLATE THICKNESS (mm) | THICKNESS RATIO | WELDING CURRENT (KA) | WELDING SPEED (m/min) | | |
|---|---|---|---|---|---|
| | | | 10 | 15 | 20 |
| 0.7×1.0 | 1.4 | 26 | (1) | (1) | (2) |
| 1.0×1.4 | 1.4 | 31 | (1) | (1) | (2) |
| 0.7×1.4 | 2.0 | 27 | (1) | (1) | (2) | n=10

MASH SEAM WELDING PROCESS AND MASH SEAM WELDING APPARATUS

FIELD OF THE ART

This invention relates to a mash seam welding process and a mash seam welding apparatus for continuously welding together two plate-like workpieces by overlapping the workpieces at their edges and applying a welding current between a pair of roller electrodes while the overlapping edge portions of the two plate-like workpieces are squeezed to be mashed, by and between the pair of roller electrodes.

BACKGROUND TECHNOLOGY

High-speed welding is possible by mash seam welding in which two plate-like workpieces are continuously welded together at their overlapping edge portions while the edge portions are squeezed to be mashed by and between a pair of roller electrodes, with a welding current being applied between the pair of roller electrodes. Since the mash seam welding is suitable for mass production, it is widely employed in production lines for steel plates, automobiles, etc.

In the mash seam welding described above, the two plate-like workpieces are positioned relative to each other by a clamping or guiding device that predetermined portions of the workpieces overlap each other, and the workpieces are fed so that the overlapping portions are squeezed by the pair of roller electrodes. Then, the two plate-like workpieces are continuously welded with a welding current applied between the roller electrodes while the overlapping portions of the workpieces are firmly squeezed and mashed by the roller electrodes.

In such mash seam welding, a so-called "weld nugget" N is formed based on a welding current applied to the pair of roller electrodes, such that the weld nugget N is located in a central part of the thickness of a portion of two plate-like workpieces $12_H$, $12_M$ squeezed by the pair of roller electrodes, as shown in FIG. 10. The formed weld nugget N extends across an interface G of the two plate-like workpieces $12_H$, $12_M$, so that the weld may be given a predetermined strength (tensile strength). In FIG. 10, $W_G$ represents a width dimension of the interface G, while $W_N$ represents a width dimension of the weld nugget N in the direction of the interface. The weld strength obtained by the mash seam welding depends upon a ratio $W_N/W_G$, namely, a nugget ratio $R_N$, which is the ratio of the width dimension $W_N$ of the weld nugget N to the width dimension $W_G$ of the interface G. The weld strength of the mash seal welding increases as this nugget ratio $R_N$ increases.

Where two plate-like workpieces having different thickness values are welded according to a conventional mash seam welding process, the interface G of the two plate-like workpieces $12_H$, $12_M$ mashed by the pair of roller electrodes is formed at a position which is offset from the center of the thickness of the mashed portion in the direction toward the thin plate-like workpiece $12_M$, as indicated in FIG. 11. However, the weld nugget N is formed at a position intermediate between the pair of roller electrodes, that is, at a central part of the thickness of the mashed portion of the two plate-like workpieces $12_H$, $12_M$ squeezed between the pair of roller electrodes. Accordingly, it is difficult to form the weld nugget N in alignment with the interface G of the two plate-like workpieces $12_H$, $12_M$, and is therefore difficult to obtain the desired weld strength in some cases.

While it is of course possible to increase the nugget ratio $R_N$ indicated above by increasing the amount of the welding current to thereby form a large weld nugget N, an increase in the nugget ratio $R_N$ leads to easy occurrence of cracking on the surfaces of the plate-like workpieces due to enlargement of the weld nugget N which undergoes rapid volumetric expansion. This cracking may develop into rupture in a subsequent press-forming process, for example. In view of this, the application of the mash seam welding is conventionally limited to the workpieces whose thickness ratio is not larger than a predetermined upper limit, for example, about 1.5, and the mash seam welding is not conventionally practiced where the thickness ratio of the workpieces exceeds the upper limit.

On the other hand, there has been proposed a seam welding process in which a shim is superposed on a thinner one of two plate-like workpieces so that the interface G of the two plate-like workpieces is located intermediate between a pair of roller electrodes, as disclosed in JP-A-63-63575. This seam welding process requires the shim as well as the two plate-like workpieces to be clamped by a clamping device adapted to position the two plate-like workpieces relative to each other. Therefore, this process has a drawback that the operation efficiency is inevitably lowered. Further, where the two plate-like workpieces are positioned relative to each other by using guide rollers while the workpieces are fed toward the roller electrodes, there is a drawback that the above seam welding process using the shim cannot be practiced.

The present invention was made in the light of the above background situation. It is therefore an object of the present invention to provide a mash seam welding process and a mash seam welding apparatus, which permit a sufficient weld strength even where two plate-like workpieces have different thicknesses.

DISCLOSURE OF THE INVENTION

The above object may be achieved according to the principle of the present invention, which provides a mash seam welding process continuously welding a first plate-like workpiece and a second plate-like workpiece which has a smaller thickness than the first plate-like workpiece and which overlaps the first plate-like workpiece, by applying a welding current between a pair of roller electrodes disposed rotatably about respective axes thereof, to thereby form a weld nugget at an interface of the two plate-like workpieces while the overlapping portions are squeezed by the pair of roller electrodes, wherein an amount of mashing of the first plate-like workpiece by one of the pair of roller electrodes is made larger than that of the second plate-like workpiece by the other of the pair of roller electrodes.

In the present process in which the amount of mashing of the first thick plate-like workpieces by the first plate-like workpieces is larger than that of the second thin plate-like workpiece, the position of the interface of the two plate-like workpieces is shifted to a position intermediate between the pair of roller electrodes, so that the weld nugget formed at the position intermediate between the pair of roller electrodes extends across the above-indicated interface, permitting a sufficient weld strength.

Preferably, a surface area of contact of the above-indicated one roller electrode with the first plate-like workpiece is made smaller than a surface area of contact of the other roller electrode with the second plate-like workpiece. This arrangement is advantageous in that the amount of mashing of the first thick plate-like workpiece is made larger than that of the second thin plate-like workpiece, when the pair of plate-like workpieces are squeezed and mashed by the pair of roller electrodes.

It is also preferable that wherein a length of contact of the above-indicated one roller electrode with the first plate-like workpiece in an axial direction of the pair of roller electrodes is made smaller than that of the other roller electrode with the second plate-like workpiece in the axial direction. This arrangement is also advantageous in that the amount of mashing of the first thick plate-like workpiece is made larger than that of the second thin plate-like workpiece, when the pair of plate-like workpieces are squeezed and mashed by the pair of roller electrodes.

It is also preferable that the above-indicated one roller electrode located on the side of the first plate-like workpiece has a smaller diameter than the other roller electrode located on the side of the second plate-like workpiece. This arrangement is advantageous in that the amount of mashing of the first thick plate-like workpiece is made larger than that of the second thin plate-like workpiece, even though the lengths of contact of the pair of roller electrodes with the first and second plate-like workpieces are the same.

It is also preferable that the pair of plate-like workpieces are fed at a speed of 20 m/min. or higher while the plate-like workpieces are squeezed by the above-indicated pair of roller electrodes. In this arrangement in which the welding speed is increased, the contact resistance of the pair of roller electrodes and the two plate-like workpieces is made higher than the specific resistance of the plate-like workpieces, so that the weld nugget formed within the two plate-like workpieces is formed along the interface, with a result of an increase in the nugget ratio, permitting the weld to have a sufficient strength even where the pair of roller electrodes have different surface areas of contact with the two plate-like workpieces having different thickness values.

The above object may also be achieved according to another aspect of the invention, which provides a mash seam welding process of continuously welding a first plate-like workpiece and a second plate-like workpiece which has a smaller thickness than the first plate-like workpiece and which overlaps the first plate-like workpiece, while overlapping portions of the two plate-like workpieces are squeezed a pair of roller electrodes disposed rotatably about respective two parallel axes thereof, the process comprising: a welding step of continuously welding the two plate-like workpieces by applying a welding current between a pair of roller electrodes, to thereby form a weld nugget at an interface of the two plate-like workpieces, while the two plate-like workpieces are squeezed by the pair of roller electrodes; and a preliminary treatment step of reducing the thickness of a welding portion of the first plate-like workpiece, prior to the welding step. In this arrangement, the thickness of the welding portion of the first thick plate-like workpiece is first reduced, so as to reduce the thickness difference with respect to the welding portion of the second thin plate-like workpiece, so that the weld nugget formed at the position intermediate between the pair of roller electrodes extends across the interface of the two plate-like workpieces, permitting the weld to have a sufficient strength.

The above process of the present invention may be suitably practiced by a mash seam welding apparatus for continuously welding a first plate-like workpiece and a second plate-like workpiece which has a smaller thickness than the first plate-like workpiece and which overlaps the first plate-like workpiece, by applying a welding current between a pair of roller electrodes disposed rotatably about respective axes thereof, to thereby form a weld nugget at an interface of the two plate-like workpieces while the overlapping portions are squeezed by the pair of roller electrodes, the apparatus comprising: (a) a pair of roller electrodes disposed rotatably about respective two parallel axes thereof and biased toward each other, the pair of roller electrodes having a same diameter; and (b) a guiding device for guiding the two plate-like workpieces such that the two plate-like workpieces overlap each other with a predetermined lap amount, while the two plate-like workpieces are fed toward the pair of roller electrodes, so that the two plate-like workpieces are squeezed by the pair of roller electrodes such that a surface area of contact of one of the pair of roller electrodes with the first plate-like workpiece is smaller than a surface area of contact of the other of the pair of roller electrodes with the second plate-like workpiece.

In the present apparatus wherein the surface area of contact of one of the above-indicated pair of roller electrodes with the first plate-like workpiece is made smaller than that of the other roller electrode with the second plate-like workpiece, the amount of mashing of the first thick plate-like workpiece is made larger than that of the second thin plate-like workpiece when the pair of plate-like workpieces are squeezed and mashed by the pair of roller electrodes. Accordingly, the position of the interface of the two plate-like workpieces is shifted to a position intermediate between the pair of roller electrodes, so that the weld nugget formed at the position intermediate between the pair of roller electrodes extends across the above-indicated interface, permitting a sufficient weld strength.

Preferably, the guiding device guides the two plate-like workpieces such that a length of contact of the one roller electrode with the first plate-like workpiece in an axial direction of the pair of roller electrodes is smaller than that of the other roller electrode with the second plate-like workpiece in the axial direction. This arrangement is advantageous in that the amount of mashing of the first thick plate-like workpiece is made larger than that of the second thin plate-like workpiece when the pair of plate-like workpieces are squeezed and mashed by the pair of roller electrodes.

In one arrangement of the above preferred form of the apparatus, the pair of roller electrodes have respective outer circumferential contact surfaces and are disposed such that widthwise centerlines of the outer circumferential contact surfaces are substantially aligned with each other, and the guiding device guides the pair of plate-like workpieces such that an edge of the first plate-like workpiece is located between a widthwise end of the outer circumferential contact surface of the one roller electrode on the side of the first plate-like workpiece and the widthwise centerline of the outer circumferential contact surface of the one roller electrode, while an edge of the second plate-like workpiece is located at an widthwise end of the outer circumferential contact surface of the other roller electrode on the side of the first plate-like workpiece.

In another arrangement of the above preferred form of the apparatus, the pair of roller electrodes have respective outer circumferential contact surfaces and are disposed such that widthwise centerlines of the outer circumferential contact surfaces are offset from each other by a predetermined distance in an axial direction thereof, and wherein the guiding device guides the two plate-like workpieces such that a centerline of the overlapping edge portions of the two plate-like workpieces is substantially aligned with the widthwise centerline of the outer circumferential contact surface of the one of the pair of roller electrodes which is located on the side of the plate-like workpiece having a smaller thickness.

In a further arrangement of the above preferred form of the apparatus, the roller electrode which is located on the side of the plate-like workpiece having a larger thickness has an outer circumferential contact surface having a width dimension smaller than an outer circumferential contact surface of the other of the pair of roller electrodes which is located on the side of the plate-like workpiece having a smaller thickness, the pair of roller electrodes being disposed such that widthwise centerlines of the outer circumferential contact surfaces are substantially aligned with each other, and wherein the guiding device guides the pair of plate-like workpieces such that a centerline of the overlapping edge portions of the two plate-like workpieces is substantially aligned with the widthwise centerlines of the outer circumferential contact surfaces of the roller electrode.

It is also preferable that the one of the pair of roller electrodes located on the side of the first plate-like workpiece has a smaller diameter than the other roller electrode located on the side of the second plate-like workpiece. This arrangement is advantageous in that the amount of mashing of the first thick plate-like workpiece is made larger than that of the second thin plate-like workpiece, even where the guiding device is adapted to guide the pair of plate-like workpieces such that the lengths of contact of the pair of roller electrodes with the first and second plate-like workpieces in the axial direction are equal to each other.

It is also preferable that the apparatus further comprises a feeding device for feeding the pair of plate-like workpieces at a speed of 20 m/min. or higher while the pair of plate-like workpieces are squeezed by the pair of roller electrodes. In this arrangement, the feeding device for feeding the plate-like workpieces permits a high welding speed, and causes a higher resistance of contact of the pair of roller electrodes with the two plate-like workpieces than the specific resistance of the plate-like workpieces, whereby the nugget ratio of the weld nugget formed along the interface of the two plate-like workpieces is increased, advantageously permitting a sufficient weld strength.

The above object may also be achieved according to a further aspect of the invention, which provides a mash seam welding apparatus for continuously welding a first plate-like workpiece and a second plate-like workpiece which has a smaller thickness than the first plate-like workpiece and which overlaps the first plate-like workpiece, while the overlapping portions of the two plate-like workpieces are squeezed by a pair of roller electrodes disposed rotatably about respective two parallel axes thereof, characterized by comprising: a work feeding device for feeding the two plate-like workpieces in one direction; a welding portion for continuously welding the two plate-like workpieces by applying a welding current between a pair of roller electrodes, to thereby form a weld nugget at an interface of the two plate-like workpieces, while the two plate-like workpieces are fed by the work feeding device and squeezed by the pair of roller electrodes; and a preliminary treatment device disposed upstream of the welding portion, for reducing the thickness of a welding portion of the first plate-like workpiece. In this arrangement wherein the thickness of the welding portion of the first thick plate-like workpiece is reduced prior to the welding by the pair of roller electrodes, the thickness difference of the welding portion of the first thick plate-like workpiece with respect to that of the second thin plate-like workpiece is reduced, so that the weld nugget formed intermediate between the pair of roller electrodes extends across the interface of the two plate-like workpieces, advantageously permitting a sufficient weld strength.

BEST MODE FOR CARRYING OUT THE INVENTION

Figure 1:
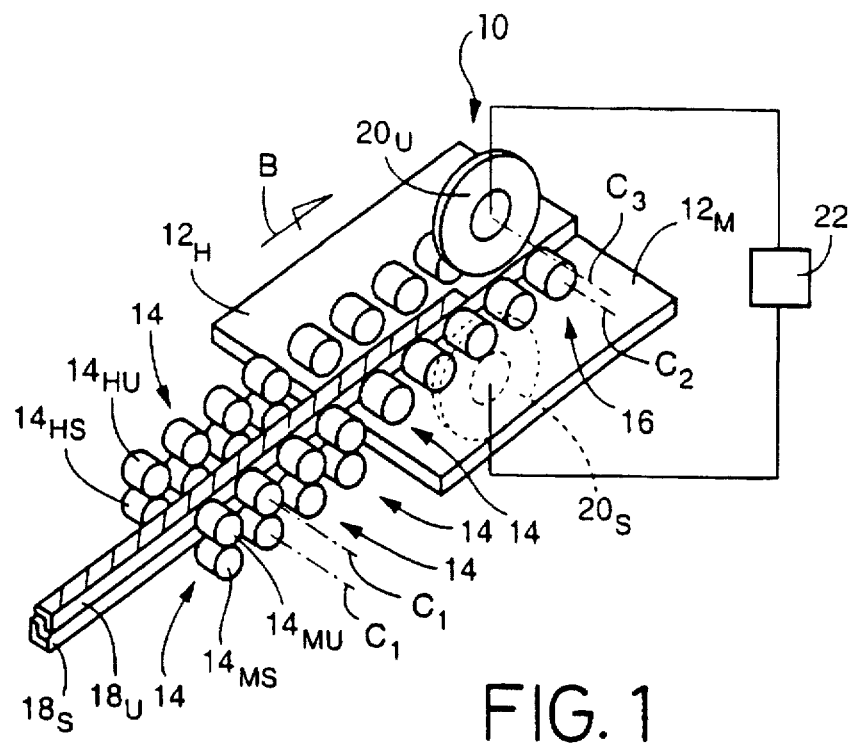
FIG. 1 is a perspective view schematically showing a manner of feeding plate-like workpieces to explain a mash seam welding process of the present invention.

There will be described embodiments of this invention in detail referring to the drawings. FIG. 1 through FIG. 5 are views explaining a seam welding process to be practiced according to this invention, while FIG. 6 through FIG. 9 are views explaining a seam welding apparatus 10 adapted to practice the seam welding process.

Figure 2:
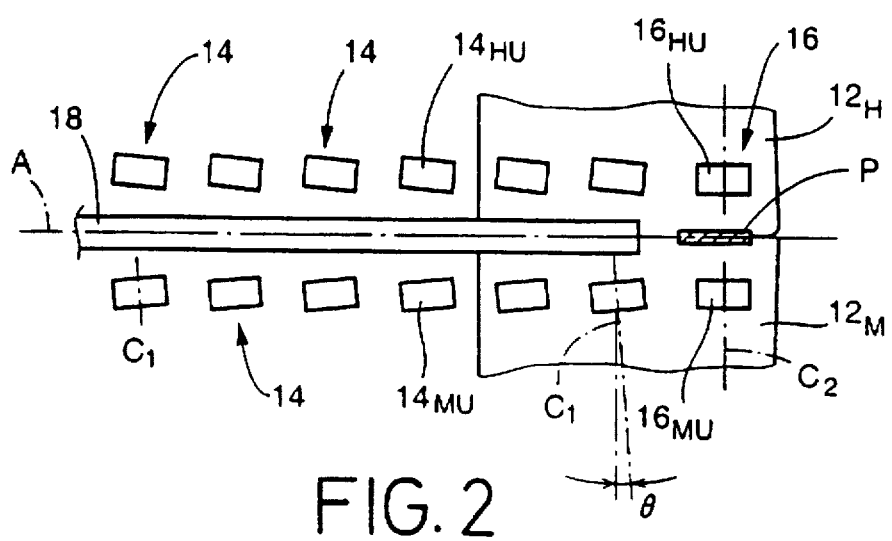
FIG. 2 is a plan view explaining an arrangement of guide rollers and retainer rollers used for feeding the plate-like workpieces, to explain the mash seam welding process according to the embodiment of FIG. 1.

In FIGS. 1 and 2, there are shown a pair of left and right plate-like workpieces $12_H$, $12_M$ which are separate plates such as zinc steel plates having given shapes. The plate-like workpiece $12_H$ has a larger thickness than the plate-like workpiece $12_M$. These plate-like workpieces $12_H$, $12_M$ are fed in a predetermined feeding direction B by a plurality of sets of guide rollers 14 (Feeding Step), while the two plate-like workpieces $12_H$, $12_M$ are guided and positioned relative to each other by a pair of upper and lower plate-like guide members $18_U$, $18_S$ in sliding contact with guide surfaces $24_U$, $24_S$ such that edge portions of the plate-like workpieces $12_H$, $12_M$ overlap each other with a predetermined lap amount (lap width) S (Guiding Step). The thus positioned two plate-like workpieces $12_H$, $12_M$ are squeezed under pressure at their overlapping edge portions, by a pair of upper and lower roller electrodes $20_U$, $20_S$. In this condition, an electric current supplied from a power source is applied between the pair of roller electrodes $20_U$, $20_S$, whereby the two plate-like workpieces $12_H$, $12_M$ are welded together at their overlapping edge portions, along a welding centerline A which is parallel to the feeding direction B and which passes a center of the lap width S of the overlapping edge portions (Welding Step). A set of retainer rollers 16 are disposed on opposite sides of the roller electrodes $20_U$, $20_S$, for holding the pair of plate-like workpieces $12_H$, $12_M$ under welding, with a predetermined squeezing force in the direction of thickness of the workpieces, so as to prevent movement of the workpieces away from each other (Holding Step).

Each of the above-indicated sets of guide rollers 14 consists of a pair of upper and lower guide rollers $14_{HU}$, $14_{HS}$ disposed to pinch the plate-like workpiece $12_H$ with a predetermined pinching force in the direction of thickness of the workpiece, and another pair of upper and lower guide rollers $14_{MU}$, $14_{MS}$ disposed to pinch the other plate-like workpiece $12_M$ with a predetermined pinching force in the direction of thickness of the workpieces. The sets of guide rollers 14 are arranged in the feeding direction B, and include at least one set of guide rollers 14 which are positively driven. Each guide roller $14_{HU}$, $14_{HS}$, $14_{MU}$, $14_{MS}$ of each set is supported rotatably about a horizontal axis C1 which lies in a plane inclined a suitable angle θ with respect to a plane perpendicular to the welding centerline A and which is located above or below the welding centerline A. Each pair of upper and lower guide rollers $14_{HU}$ and $14_{HS}$, or $14_{MU}$ and $14_{MS}$ is given a suitable pinching force by a cylinder device $56_H$, $56_M$ described below, for example, such that the pinching force acts on the upper and lower guide rollers in a direction toward each other. The pinching force is determined so as to generate a friction force enough to permit the upper and lower rollers to generate a force consisting of a component for feeding the plate-like workpiece $12_H$, $12_M$ in the feeding direction B and component for moving the workpiece in the direction toward the guide members $18_U$, $18_S$.

The above-indicated set of retainer rollers 16 consists of a pair of upper and lower retainer rollers $16_{HU}$, $16_{HS}$ which are disposed on one side of the roller electrodes $20_U$, $20_S$ to hold the plate-like workpiece $12_H$ with a predetermined squeezing force in the direction of thickness of the workpiece, and another pair of upper and lower retainer rollers $16_{MU}$, $16_{MS}$ disposed on the other side of the roller electrodes $20_U$, $20_S$ to hold the other plate-like workpieces $12_M$ with a predetermined squeezing force in the direction of thickness of the workpiece. Thus, the two pairs of retainer rollers 16 are disposed such that the roller electrodes $20_U$, $20_S$ are interposed between the retainer rollers 16. Each pair of upper and lower retainer rollers $16_{HU}$ and $16_{HS}$, or $16_{MU}$ and $16_{MS}$ is given a comparatively large squeezing force by a cylinder device similar to the cylinder device $56_H$, $56_M$ described below, for example, such that the squeezing force acts on the upper and lower retainer rollers in a direction toward each other. The squeezing force is determined so as to prevent the edge portions of the pair of plate-like workpieces 12H, 12M under welding from moving away from each other. Each retainer roller $16_{HU}$, $16_{HS}$, $16_{MU}$, $16_{MS}$ is supported rotatably about a horizontal axis C2 which lies in a plane perpendicular to the welding centerline A and which is located above or below the welding centerline A. The plate-like workpieces $12_H$, $12_M$ under feeding, namely, under welding are retained by the above-indicated squeezing force to prevent the movements of their edge portions away from each other (Holding Step).

Each of the above-indicated pair of roller electrodes $20_U$, $20_S$ is supported rotatably about a horizontal axis C3 which lies in a plane perpendicular to the welding centerline A and which is located above or below the welding centerline A. The pair of roller electrodes $20_U$, $20_S$ is given a comparatively large squeezing force by a cylinder device by a cylinder device 80 described below, for example, such that the squeezing force acts on the roller electrodes in a direction toward each other. The squeezing force is determined so as to permit the overlapping edge portions of the plate-like workpieces $12_H$, $12_M$ to be mashed by an amount enough to reduce the overall lap thickness to the approximate thickness of one of the workpieces $12_H$, $12_M$. The squeezing portion of the roller electrodes $20_U$, $20_S$ is indicated at P in FIG. 2.

Figure 3:
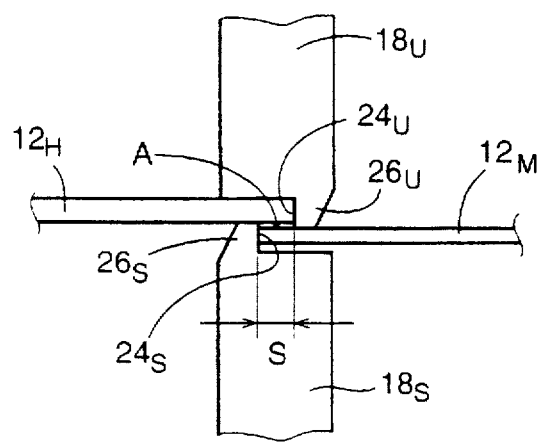
FIG. 3 is a view showing portions of guide members by which the plate-like workpieces are slidably guided, to explain a workpiece guiding step in the embodiment of FIG. 1.

As shown in detail in FIG. 3, the above-indicated plate-like guide members 18U, 18S are disposed with a predetermined amount of gap left between mutually opposed end faces thereof, so as to extend along the welding centerline A and between the pair of upper and lower guide rollers $14_{HU}$, $14_{HS}$ for holding the one plate-like workpiece $12_H$, and the pair of upper lower guide rollers 14MU, 14MS for holding the other plate-like workpiece 12M, such that the guide members 18U, 18S are spaced apart by a predetermined small distance from the pair of roller electrodes $20_U$, $20_S$. The upper guide member $18_U$ has a projecting rail $26_U$ formed at a portion of its end face on the side of the plate-like workpiece $12_M$. The projecting rail $26_U$ has a guide surface $24_U$ for sliding contact with the end face of the plate-like workpiece $12_H$. The lower guide member $18_S$ has a projecting rail $26_S$ formed at a portion of its end face on the side of the plate-like workpiece $12_H$. The projecting rail $26_S$ has a guide surface $24_S$ for sliding contact with the end face of the plate-like workpiece $12_M$.

As shown in FIG. 2, the rotation axis C1 of at least one set (all sets in this embodiment) of the guide rollers 14 disposed on the left and right sides of the guide members $18_U$, $18_S$ is inclined a predetermined small angle θ (1°–3° in this embodiment) with respect to the line perpendicular to the welding centerline A, so that the plate-like workpieces $12_H$, $12_M$ are driven or guided by the guide roller 14 in a direction (in the direction of the driving force $F_R$ described below) which is inclined inwardly by the predetermined angle θ with respect to the feeding direction B.

Figure 4:
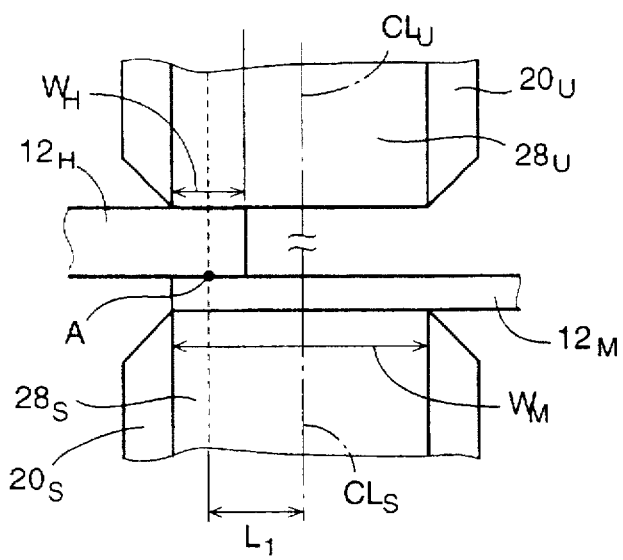
FIG. 4 is a view explaining a positional relationship between a pair of roller electrodes and the edge portions of the pair of plate-like workpieces pinched by the roller electrodes in a welding step.

When the plate-like workpiece $12_M$ is in abutting contact with the guide surface $24_S$, for example, the plate-like workpiece $12_M$ is fed while it is pressed toward the guide surface $24_S$. Similarly, the plate-like workpiece $12_H$ is fed while it is pressed toward the guide surface $24_U$. Thus, the pair of plate-like workpieces $12_H$, $12_M$ are positioned relative to each other with their edge portions overlapping over the predetermined lap width S, before the workpieces are squeezed by the upper and lower roller electrodes $20_U$, $20_S$. In this arrangement, the pair of plate-like workpieces $12_H$, $12_M$ are automatically positioned relative to each other during feeding thereof through a feeding path, even if the workpieces do not have the predetermined relative position when they are introduced into the feeding path. The above-indicated guide members $18_U$, $18_S$ are adapted to guide the plate-like workpieces $12_H$, $12_M$ such that the edge portions of the plate-like workpieces $12_H$, $12_M$ squeezed between the roller electrodes $20_U$, $20_S$ are positioned as indicated in FIG. 4. Namely, the guide members $18_U$, $18_S$ are disposed at the appropriate positions for positioning the workpieces as indicated in FIG. 4. In the guiding step in the present embodiment, the pair of plate-like workpieces $12_H$, $12_M$ are guided and positioned relative to each other by the above-indicated guide members $18_U$, $18_S$ and the guide rollers 14 disposed on the left and right sides of the guide members $18_U$, $18_S$, so that the edge portions of these plate-like workpieces $12_H$, $12_M$ may be squeezed by the roller electrodes $20_U$, $20_S$, as indicated in FIG. 4. In the present embodiment, the above guide members $18_U$, $18_S$ and the guide rollers 14 disposed on the left and right sides of the guide members $18_U$, $18_S$ function as a guiding device.

FIG. 4 shows the overlapping edge portions of the thick plate-like workpiece $12_H$ and the plate-like workpiece $12_M$ having a thickness smaller than the plate-like workpiece $12_H$, which overlapping edge portions are positioned between the roller electrodes $20_U$, $20_S$ which have respective outer circumferential contact surfaces $28_U$, $28_S$ and which are disposed such that widthwise centerlines $CL_U$, $CL_S$ of the outer circumferential contact surfaces $28_U$, $28_S$ are substantially aligned with each other. The edge of the thick plate-like workpiece $12_H$ is located between the widthwise end of the outer circumferential contact surface 28U of the one roller electrode $20_U$ on the side of the plate-like workpiece $12_H$ and the centerline $CL_U$, while the edge of the thin plate-like workpiece $12_M$ is located at the widthwise end of the outer circumferential contact surface $28_S$ of the other roller electrode $20_S$ on the side of the plate-like workpiece $12_H$. That is, a length $W_H$ of contact of the one roller electrode $20_U$ with the plate-like workpiece $12_H$ is smaller than a length $W_M$ of contact of the other roller electrode $20_S$ with the plate-like workpiece $12_M$. When the edge portions of the plate-like workpiece $12_H$ and the plate-like workpiece $12_S$ whose thickness is smaller than the plate-like workpiece $12_H$ are squeezed between the roller electrodes $20_U$, $20_{HS}$ while these edge portions overlap each other as shown in FIG. 4, the amount of mashing of the thick plate-like workpiece $12_H$ is larger than that of the thin plate-like workpiece $12_M$, since the contact surface area of the roller electrode $20_U$ with respect to the plate-like workpiece $12_H$ is smaller than the contact surface area of the roller electrode $20_S$ with respect to the plate-like workpiece $12_S$. Consequently, the interface G of the two plate-like workpieces $12_H$, $12_M$ is formed at a position intermediate between the pair of roller electrodes $20_U$, $20_S$, whereby the weld nugget N formed is more likely to extend across the above-indicated interface G. Accordingly, the present arrangement results in an increase in the nugget ratio $R_N$ which is the ratio $W_N/W_G$ (ratio of the width $W_N$ of the weld nugget N in the direction of the interface G to the width dimension $W_G$ of the interface G), so that the weld can be given a sufficient strength.

Figure 6:
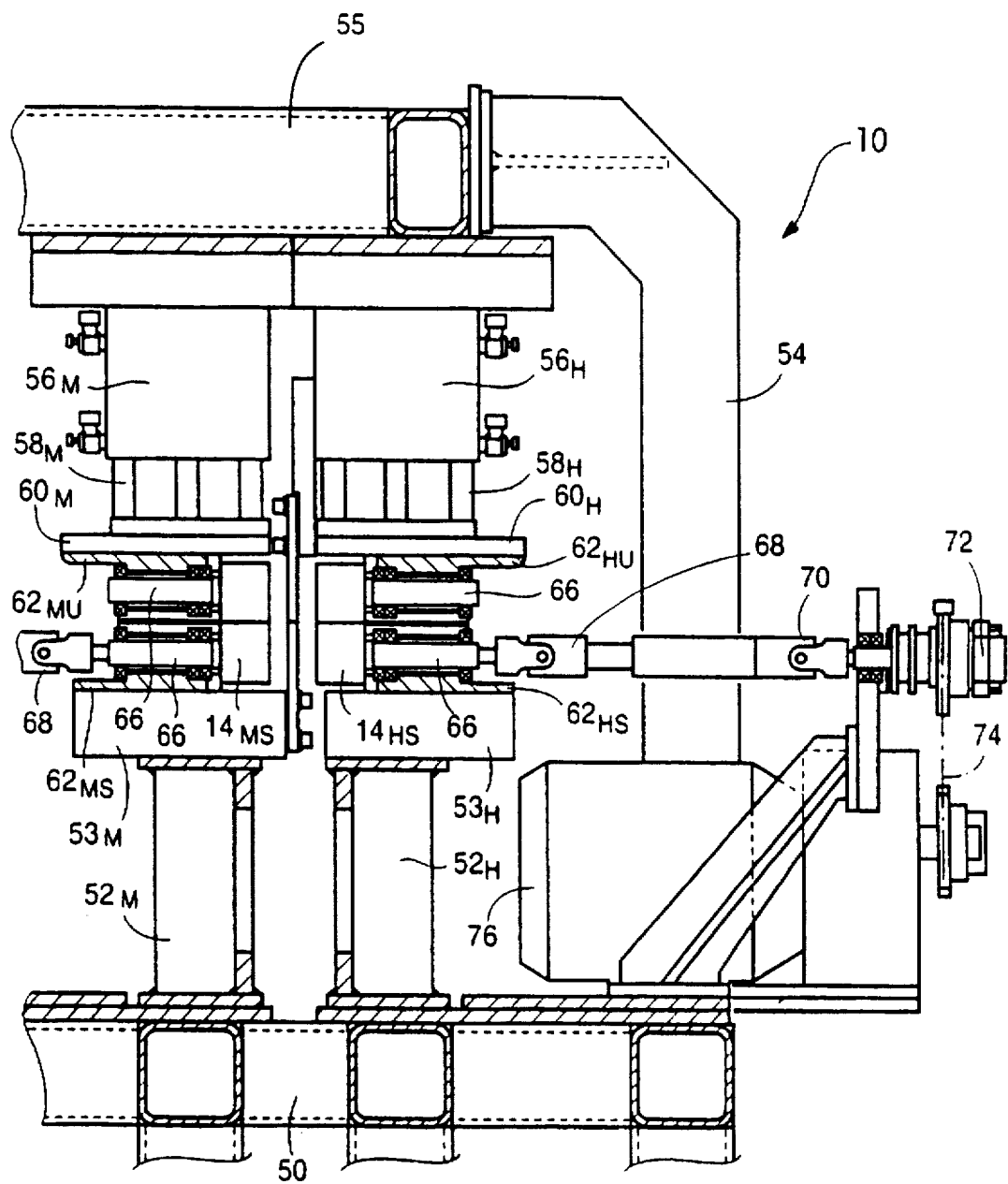
FIG. 6 is view in cross section showing the guide rollers and their vicinity of a seam welding apparatus suitable for practicing the seam welding process of FIG. 1, taken in a plane perpendicular to a feeding direction of the plate-like workpieces.
Figure 7:
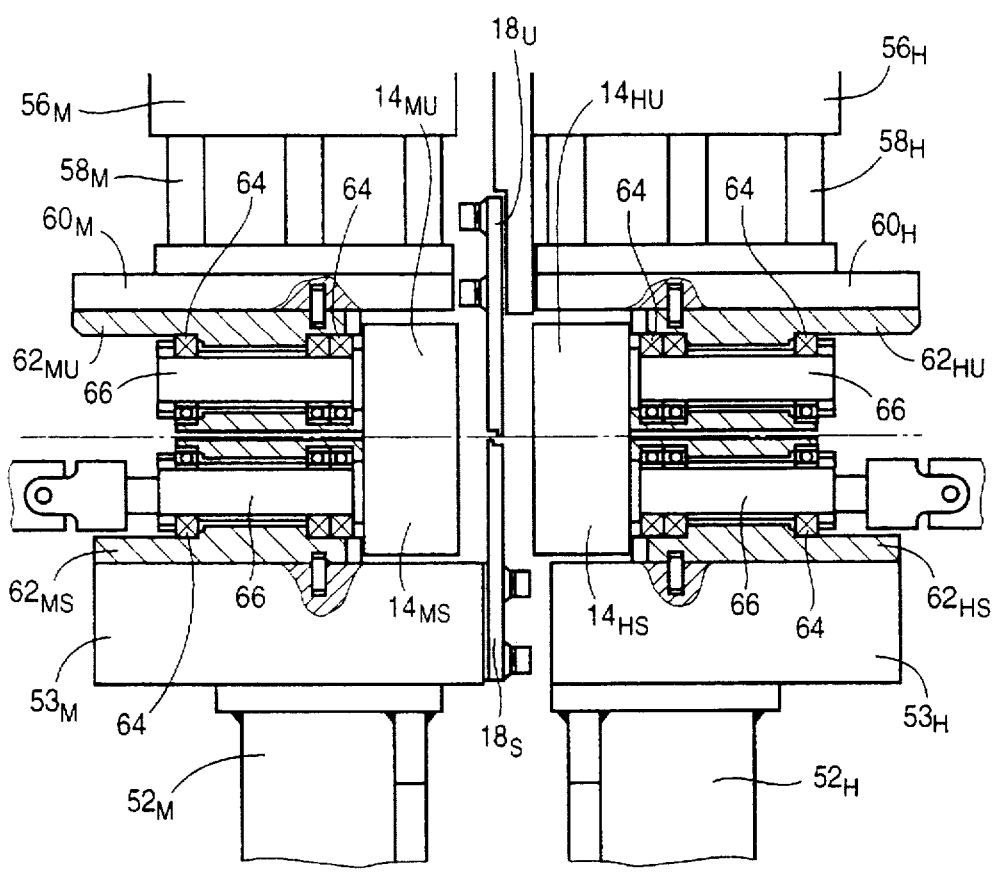
FIG. 7 is a view showing in enlargement a portion of the seam welding apparatus of FIG. 6.
Figure 8:
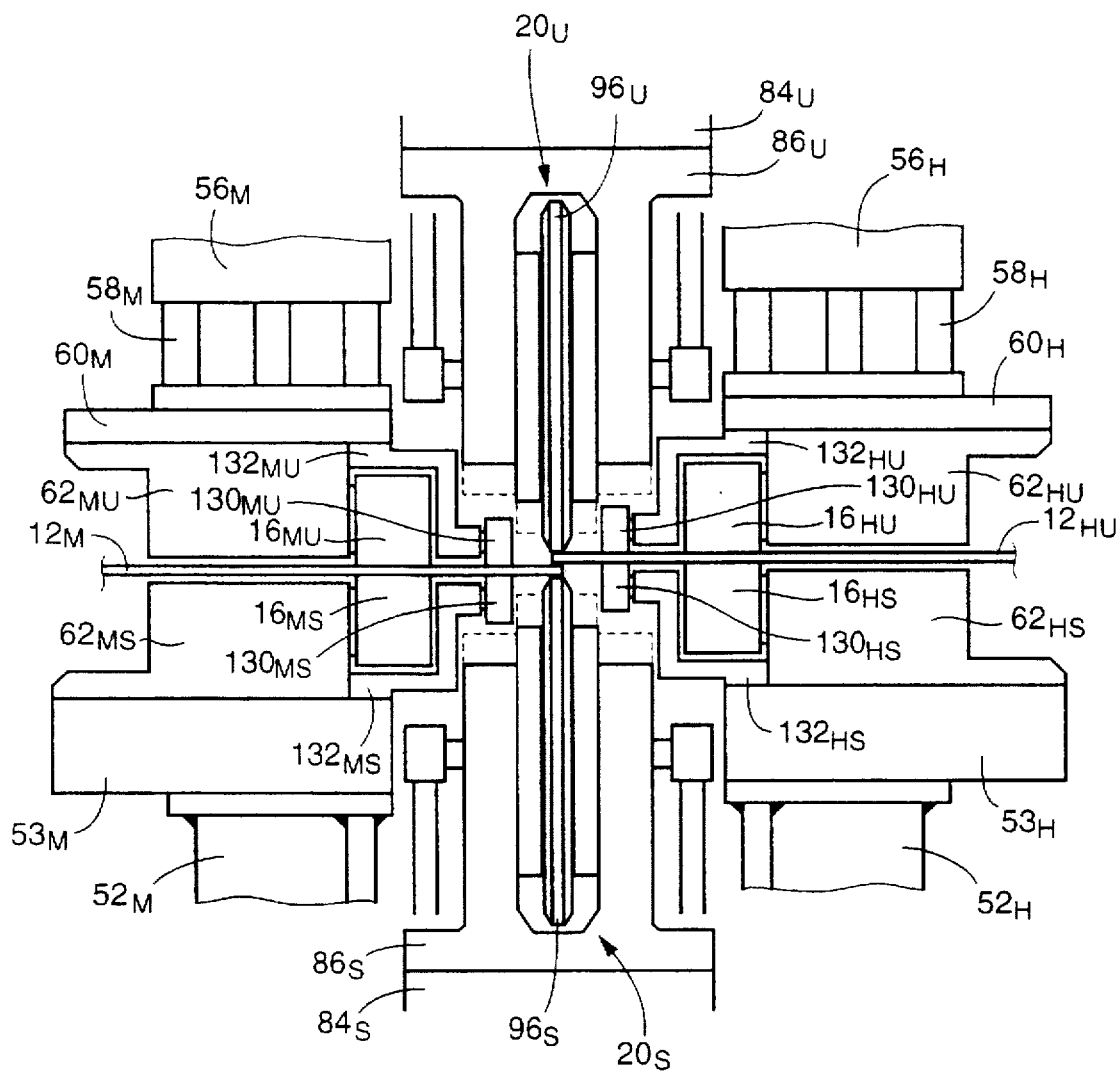
FIG. 8 is a view showing the roller electrodes and their vicinity of the seam welding apparatus of FIG. 6, taken in the plane perpendicular to the feeding direction of the plate-like workpieces.
Figure 9:
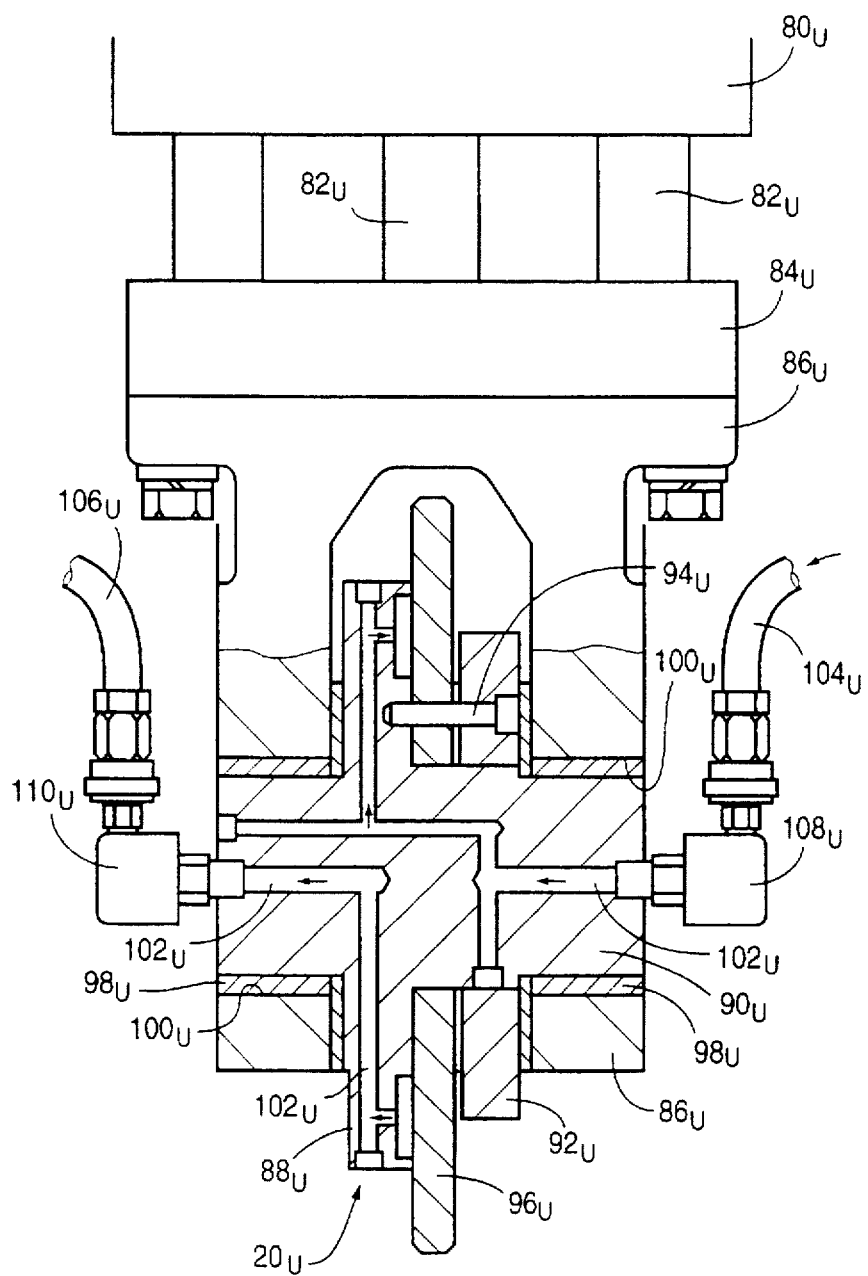
FIG. 9 is a partly cut-away view explaining the roller electrodes and their vicinity of the seam welding apparatus of FIG. 6.
Figure 10:
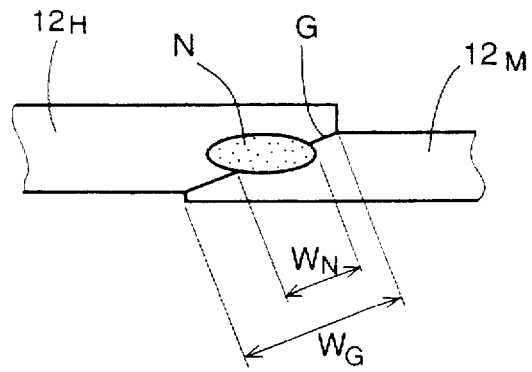
FIG. 10 is a view for explaining a definition of a nugget ratio.

The mash seam welding apparatus 10 for practicing the mash seam welding process explained above is constructed as shown in FIGS. 6–9. FIG. 6 is a cross sectional view perpendicular to the feeding direction, showing the guide rollers 14 and their vicinity of the mash seam welding apparatus 10. FIG. 7 is a view showing in enlargement the guide rollers 14 and their vicinity. FIG. 8 is a view explaining an arrangement of the roller electrodes $20_U$, $20_S$ and their vicinity, while FIG. 9 is a partly cut-away view explaining the support structure for the roller electrode $20_U$.

Since the guide rollers 14 and the retainer rollers 16 are basically identical in construction to each other, the construction of the guide rollers 14 and the support structure thereof will be described by way of example.

Referring to FIGS. 6 and 7, a base frame 50 extends in the welding direction B, and a pair of posts $52_H$, $52_M$ are disposed upright on the base frame 50. On the upper end faces of the posts $52_H$, $52_M$, there are provided the guide rollers $14_{HS}$, $14_{MS}$ via base blocks $53_H$, $53_M$. A top frame 55 is fixed to the base frame 50 through an outer frame 54. To the top frame 55, there are fixed a pair of left and right cylinder devices $56_H$, $56_M$ for giving the pinching forces to the pair of upper and lower guide rollers $14_{HU}$, $14_{HS}$ and the pair of upper and lower guide rollers $14_{MH}$, $14_{MS}$, respectively. Movable rods $58_H$, $58_M$ extend downward from the cylinder devices $56_H$, $56_M$, such that the movable rods $58_H$, $58_S$ are movable. To the lower ends of the movable rods $58_H$, $58_M$, there are fixed movable plates $60_H$, $60_M$ on which the guide rollers $14_{HU}$, $14_{MU}$.

The set of guide rollers $14_{HS}$, $14_{MS}$, $14_{HU}$, $14_{MU}$ are provided with respective integrally formed shafts 66 which are supported by respective shaft cases $62_{HS}$, $62_{MS}$, $62_{HU}$, $64_{MU}$ through bearings 64. The above-indicated shaft cases $62_{HS}$, $62_{MS}$ are fixed to the upper end faces of the posts $52_H$, $52_M$, while the above-indicated shaft cases $62_{HU}$, $62_{MU}$ are fixed to the movable plates $60_H$, $60_M$. The guide rollers $14_{HS}$, $14_{MS}$ are rotatable about the axis C1 located below the welding centerline A while the guide rollers $14_{HU}$, $14_{MU}$ are rotatable about the axis C, located above the welding centerline A. As shown in FIG. 3, the guide members $18_U$, $18_S$ are fixed to the cylinder device $56_H$ and the post $52_M$, respectively, such that the guide members $18_U$, $18_S$ are disposed with the predetermined amount of gap left between their mutually opposed end faces, and extend between the pair of upper and lower guide rollers $14_{HU}$, $14_{HS}$ for holding the one plate-like workpiece $12_H$, and the pair of upper lower guide rollers $14_{MU}$, $14_{MS}$ for holding the other plate-like workpiece $12_M$, such that the welding centerline A is aligned with the widthwise centers of the opposed end faces of the guide members 18U, 18S.

Each of the shafts 66 of the lower guide rollers $14_{HS}$, $14_{MS}$ is connected to a drive motor 76 through a pair of joints 68, 70, an intermediate shaft 72, and a chain 74. The intermediate shaft 72 is provided for each of the left and right guide rollers $14_{HS}$, $14_{MS}$ of each set of guide rollers 14, and these intermediate shafts 72 are connected to each other by chains and to the drive motor 76, for simultaneous rotation at the same speed. In this arrangement, the lower rollers $14_{HS}$, $14_{MS}$ of the guide rollers 16 are rotated by the drive motor 76 to feed the pair of plate-like workpieces 14HS, 14MS. In the present embodiment, the drive motors 76 function as a driving device for rotating the guide rollers 14. Similar drive motors are used as a driving device for rotating the retainer rollers 16.

The pairs of upper and lower guide rollers $14_{HU}$, $14_{HS}$, $14_{MU}$, $14_{MS}$ are steel rollers whose outer circumferential surfaces are covered by an elastic material such as urethane rubber. The pair of guide rollers $14_{HU}$, $14_{HS}$ and the pair of guide rollers $14_{MU}$, $14_{MS}$ are squeezed toward each other by the respective cylinder devices $56_H$, $56_M$ which function as a squeezing force applying device, so that the squeezing forces acting on the guide rollers permit the generation of friction forces enough to generate the component for feeding the pair of plate-like workpieces $12_H$, $12_M$ and the component for forcing the workpieces toward the guide members $18_U$, $18_S$.

The pair of upper and lower retainer rollers $16_{HU}$, $16_{HS}$ and the pair of upper and lower retainer rollers $16_{MU}$, $16_{MS}$ which constitute one set of retainer rollers 16 are constructed similarly to the guide rollers $14_{HU}$, $14_{HS}$, $16_{MU}$, $14_{MS}$, as shown in FIG. 8. The retainer rollers 16 are rotatable about the respective rotation axes C2 described above, and are rotated by the drive motors 76 at the same peripheral speed as the guide rollers $14_{HS}$, $14_{MS}$. The pair of upper and lower retainer rollers $16_{HU}$, $16_{HS}$ and the pair of upper and lower retainer rollers $16_{MU}$, $17_{MS}$ are steel rollers whose outer circumferential surfaces are knurled to increase the generated friction forces in their axial direction, with respect to the plate-like workpieces $12_H$, $12_M$. The retainer rollers $16_{HS}$, $16_{HU}$ and the retainer rollers $16_{MS}$, $16_{MU}$ are squeezed toward each other by cylinder devices similar to the cylinder devices $56_H$, $56_M$, which also function as a squeezing force applying device. The squeezing forces given to the retainer rollers 16 are comparatively large permitting the generation of friction forces on their outer circumferential surfaces, so as to prevent the movements of the edge portions of the pair of plate-like workpieces $12_H$, $12_M$ under welding in the directions away from each other.

Auxiliary roller sets $130_{HU}$, $130_{HS}$, $130_{MU}$, $130_{MS}$ are interposed between the roller electrodes $20_U$, $20_S$ and the pair of retainer rollers $16_{HU}$, $16_{HS}$, and between the roller electrodes $20_U$, $20_S$ and the pair of retainer rollers $16_{MU}$, $16_{MS}$, in the direction perpendicular to the feeding direction B, that is, in the axial direction of the roller electrodes. These auxiliary roller sets $130_{HU}$, $130_{HS}$, $130_{MU}$, $130_{MS}$ are located so as to press the portions of the workpieces at which the convex deformation F is expected to take place. Described more specifically, the auxiliary roller sets $130_{HS}$ and $130_{MS}$ located below the plate-like workpieces $12_H$, $12_M$ are rotatably supported by the end portions of brackets $132_{HS}$ and $132_{MS}$ fixed to the base blocks $53_H$, $53_M$, while the auxiliary roller sets $130_{HU}$ and $130_{MU}$ located above the plate-like workpieces $12_H$, $12_M$ are rotatably supported by the end portions of brackets $132_{HU}$ and $132_{MU}$ fixed to the movable plates $60_H$, $60_M$. The above auxiliary roller sets $130_{HU}$, $130_{HS}$, $130_{MU}$, $130_{MS}$ are rotatable about axes C4 which are parallel to the rotation axes C3 of the roller electrodes $20_U$, $20_S$ and the axes C2 of the pair of retainer rollers $16_{HU}$, $16_{HS}$. The plate-like workpieces $12_H$, $12_M$ are pressed with predetermined squeezing forces at their portions laterally adjacent to the roller electrodes $20_U$, $20_M$, by the upper and lower auxiliary roller sets $130_{HU}$, $130_{HS}$ and the upper and lower auxiliary roller sets $130_{MU}$, $130_{MS}$.

The pair of roller electrodes $20_U$, $20_S$ have the same diameter, width and construction, as shown in FIG. 8, and only the upper roller electrode $20_U$ will be explained by reference to FIG. 9, which is a partly cut-away view showing the upper roller electrode $20_U$ and the support structure of this electrode. As shown in FIG. 9, a cylinder device $80_U$ is fixed to the above-described top frame 55, for giving the roller electrodes $20_U$, $20_S$ a squeezing force. The cylinder device $80_U$ is provided with movable rods $82_U$ extending downward such that the movable rods $82_U$ are movable. A movable plate 84 is fixed to the ends of the movable rods 82U, and a support block 86 for rotatably supporting the roller electrode $20_U$ is fixed to the movable plate 84.

The roller electrode $20_U$ comprised of a rotary shaft $90_U$ with a flange portion $88_U$ integrally formed at an axially intermediate part thereof, and a circular electrode disk $96_U$ fastened by a screw $94_U$ to the flange portion $88_U$ together with a pressure plate $92_U$. The rotary shaft $90_U$ is fitted at its opposite end portions through power supply bushings $98_U$, in a through-hole $100_U$ formed through the above-indicated support block $86_U$, whereby the rotary shaft $90_U$ is rotatably supported by the support block $86_U$. The above electrode disk $96_U$ is a highly electrically conductive body formed of a metallic material such as chromium steel, beryllium copper alloy or chromium zirconium copper alloy, which is highly durable with a small amount of wear or damage even in the presence of a comparatively large electric current applied thereto while the metallic material is in contact with the plate-like workpieces $12_H$, $12_M$. The rotary shaft $90_U$, pressure plate $92_U$, power supply bushings $98_U$ and support blocks $86_U$ are highly electrically conductive bodies formed of a metallic material such as copper alloy or aluminum alloy. The electric current is supplied from the above-indicated power source 22 to the electrode disk $96_U$ through electric wires not shown, and through the power supply bushings 98, rotary shaft $90_U$, etc.

A fluid passage $102_U$ is formed through the above-indicated rotary shaft $90_U$ such that the fluid passage $102_U$ is open in the opposite end faces of the rotary shaft $90_U$ and has an intermediate portion in the form of a circular recess formed in the surface of the flange portion $88_U$ which contacts the electrode disk $96_U$. A pair of hose joints $108_U$, $110_U$ are fixed to the end faces of the rotary shaft $90_U$, for connecting the fluid passage $102_U$ to coolant fluid hoses $104_U$, $106_U$ while permitting the rotary shaft 90U to rotate.

Figure 5:
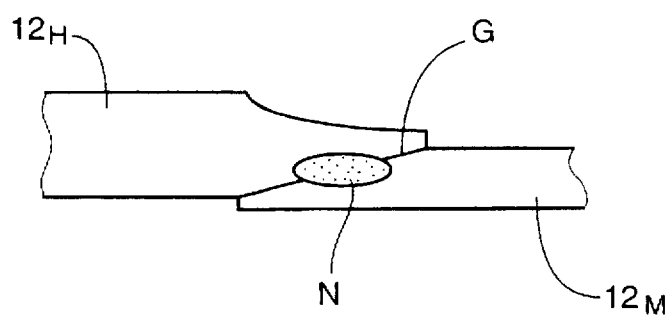
FIG. 5 is a view explaining the position of a weld nugget formed in the welding step in the embodiment of FIG. 1.

In the mash seam welding apparatus 10 constructed as described above, the plurality of sets of guide rollers 14 and the one set of retainer rollers 16 are continuously rotated by the drive motors 76, so that the pair of plate-like workpieces $12_H$, $12_M$ are fed and positioned relative to each other by the guide rollers 14 and the guide members $18_U$, $18_S$ such that the edge portions of the workpieces overlap each other over the predetermined lap width S. Then, the workpieces are squeezed and mashed by the pair of roller electrodes $20_U$, $20_S$, and a welding current is simultaneously applied between the roller electrodes $20_U$, $20_S$, whereby the workpieces are welded at their edge portions as shown in FIG. 5, for example, as described above.

In the present embodiment, the pair of plate-like workpieces $12_H$, $12_M$ are guided in the guiding step by the guiding device (guide rollers 14 and guide members $18_U$, $18_S$), in a manner as shown in FIG. 4, so that the workpieces are introduced between the pair of roller electrodes $20_U$, $20_S$. Namely, the pair of plate-like workpieces $12_H$, $12_M$ are guided during feeding thereof such that the length $W_H$ of contact of the one roller electrode $20_U$ with the plate-like workpiece $12_H$ is smaller than the length $W_M$ of contact of the other roller electrode $20_S$ with the plate-like workpiece $12_M$, in other words, such that the area of contact of the thick plate-like workpiece $12_H$ with the roller electrode $20_U$ is smaller than the area of contact of the thin plate-like workpiece $12_M$ with the roller electrode $20_S$. In this arrangement, the amount of mashing of the plate-like workpiece $12_H$ by the one roller electrode $20_U$ is larger than that of the plate-like workpiece $12_M$ by the other roller electrode $20_S$. Consequently, the interface G of the two plate-like workpieces $12_H$, $12_M$ is formed at a position intermediate between the pair of roller electrodes $20_U$, $20_S$, whereby the weld nugget N formed is more likely to extend across the above-indicated interface G, as shown in FIG. 5. Accordingly, the present arrangement results in an increase in the nugget ratio $R_N$ which is the ratio $W_N/W_G$ (ratio of the width $W_N$ of the weld nugget N in the direction of the interface G to the width dimension $W_G$ of the interface G), so that the weld can be given a sufficient strength.

The present inventors conducted an experiment in which a mash seam welding operation was performed in the following condition, for welding the plate-like workpiece $12_H$ in the form of a 1.4 mm-thick zinc steel plate and the plate-like workpiece $12_M$ in the form of a 0.7 mm-thick zinc steel plate: lap width S of the overlapping edge portions of the workpieces $12_H$, $12_M$=1.0 mm; offset distance $L_1$ of the welding centerline A from the widthwise centerlines $CL_U$, $CL_S$ of the outer circumferential contact surfaces $28_U$, $28_S$ of the roller electrodes $20_U$, $20_S$=2.0 mm; squeezing force acting on the upper and lower roller electrodes $20_U$, $20_S$= 9800N (=1000 kgf); welding current=27 kA; and welding speed =20 m/min. In the experiment, the nugget ratio $R_N$ was 50%, and the weld obtained had a sufficient strength.

Figure 11:
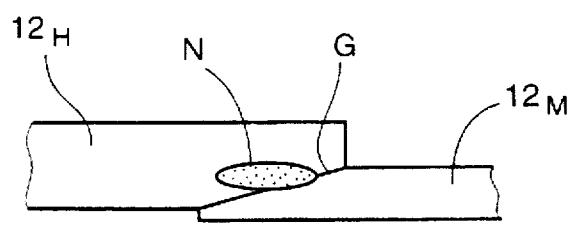
FIG. 11 is a view explaining the position of a weld nugget generated in a conventional mash seam welding process.

It is noted that a guiding device in a conventional mash seam welding apparatus is adapted to guide the plate-like workpieces $12_H$, $12_M$ such that the surface area of contact of the roller electrode $20_U$ with the plate-like workpiece $12_H$ is equal to that of the roller electrode $20_S$ with the plate-like workpiece $12_M$. Although the conventional apparatus permits the weld nugget N to be formed at a position intermediate between the pair of roller electrodes $20_U$, $20_S$, the position of the interface G of the two plate-like workpieces $12_H$, $12_M$ is offset from the weld weld nugget N toward the thin plate-like workpiece $12_M$, as indicated in FIG. 11, whereby the nugget ratio $R_N$ is as low as 20%, making it impossible to provide a sufficiently large weld strength.

There will next be described other embodiments of this invention. In the following embodiments, the reference numerals used in the preceding embodiment will be used to identify the corresponding elements, and no description of these elements will be provided.

Figure 12:
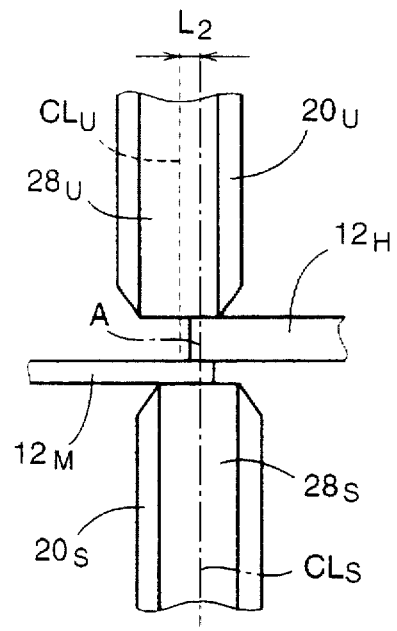
FIG. 12 is a view corresponding to that of FIG. 4, showing another embodiment of this invention.
Figure 13:
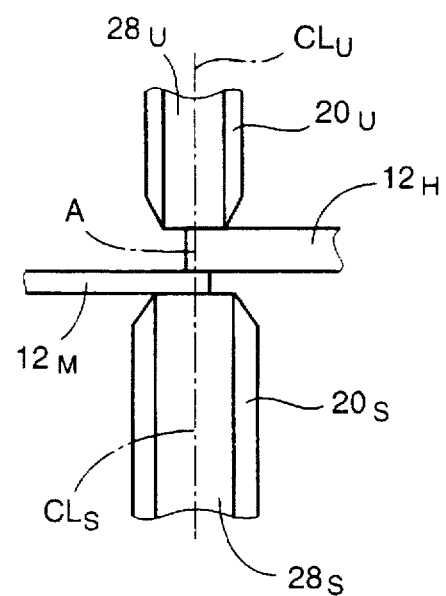
FIG. 13 is a view corresponding to that of FIG. 4, showing another embodiment of this invention.

FIGS. 12 and 13 show the pair of plate-like workpieces $12_H$, $12_M$ which are guided by guiding devices (guide rollers 14 and guide members $18_U$, $18_S$) and squeezed by the roller electrodes $20_U$, $20_S$, in other embodiments of this invention.

In the embodiment of FIG. 12, the pair of roller electrodes $20_U$, $20_S$ have the respective outer circumferential contact surfaces $28_U$, $28_S$ which have the same width dimension. However, the roller electrodes $20_U$, $20_S$ are disposed such that the widthwise centerlines $CL_U$, $CL_S$ of the outer circumferential contact surfaces $28_U$, $28_S$ are offset from each other by a predetermined distance $L_2$ in the axial direction. Further, the guiding device (guide rollers 14 and guide members $18_U$, $18_S$) is constructed so as to guide the pair of plate-like workpieces $12_H$, $12_M$ such that the centerline of the lap width S of the overlapping edge portion of the workpieces $12_H$, $12_M$, that is, the welding centerline A is substantially aligned with the widthwise centerline $CL_S$ of the roller electrode $20_S$ located on the side of the thin plate-like workpiece $12_M$.

In the embodiment of FIG. 13, the the outer circumferential surface $28_U$ of the roller electrode $20_U$ on the side of the thick plate-like workpiece $12_H$ has a smaller width dimension than the outer circumferential contact surface $28_S$ of the roller electrode $20_S$ on the side of the thin plate-like workpiece $12_M$. The pair of roller electrodes $20_U$, $20_S$ are disposed such that the widthwise centerlines $CL_U$, $CL_S$ of those outer circumferential contact surfaces $28_U$, $28_S$ are substantially aligned with each other in the axial direction. Further, the guiding device (guide rollers 14 and guide members $18_U$, $18_S$) is constructed so as to guide the two plate-like workpieces $12_H$, $12_M$ such that the centerline of the lap width S of the overlapping edge portion of the workpieces $12_H$, $12_M$, that is, the welding centerline A is substantially aligned with the widthwise centerlines $CL_U$, $CL_S$ of the roller electrodes $20_S$, $20_S$.

In both of the embodiments of FIGS. 12 and 13, the surface area of contact of the roller electrode $20_U$ with the thick plate-like workpiece $12_H$ is made smaller than that of the roller electrode $20_S$ with the thin plate-like workpiece $12_M$. When the pair of plate-like rollers $12_H$, $12_S$ are squeezed by the pair of roller electrodes $20_U$, $20_S$, the amount of mashing of the thick plate-like workpiece $12_H$ by the roller electrode $20_U$ is made larger than the amount of mashing of the thin plate-like workpiece $12_M$ by the roller electrode $20_S$. Therefore, the interface G of the two plate-like workpieces $12_H$, $12_M$ is formed at a position intermediate between the pair of roller electrodes, and the nugget ratio $R_N$ is increased, making it possible to provide a sufficient weld strength.

Figure 14:
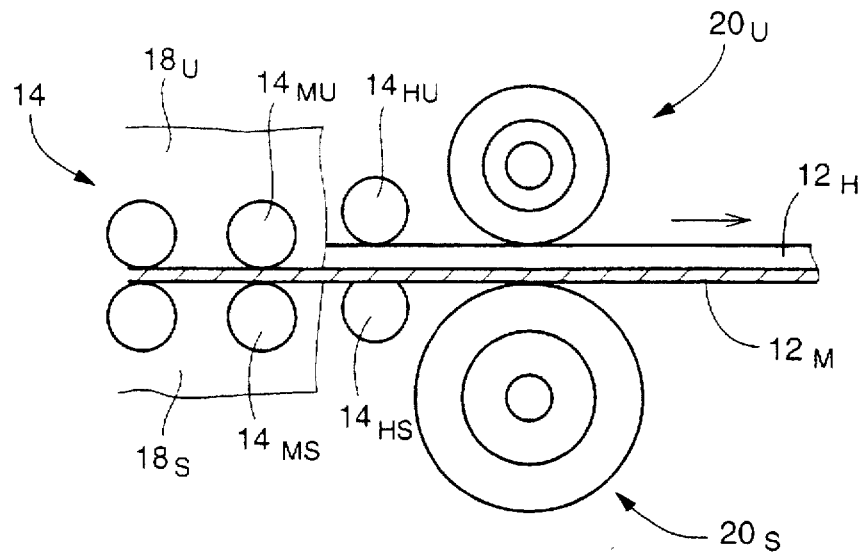
FIG. 14 is a side elevational view explaining diameters of a pair of roller electrodes in another embodiment of this invention.

FIG. 14 shows the pair of plate-like workpieces $12_H$, $12_S$ which are guided by guiding devices (guide rollers 14 and guide members $18_U$, $18_S$) and squeezed by the roller electrodes $20_U$, $20_S$, in another embodiment of this invention. In the embodiment shown in the figure, the outer circumferential surfaces $28_U$, $28_S$ of the pair of roller electrodes 20U, 20S have the same width dimension. However, the roller electrode $20_U$ located on the side of the thick plate-like workpiece $20_H$ has a smaller diameter than the roller electrode $20_S$ located on the side of the thin plate-like workpiece $20_M$. This arrangement is advantageous in that the amount of mashing of the thick plate-like workpiece $12_H$ is made larger than that of the thin plate-like workpiece $12_M$, even though the lengths $W_H$ and $W_M$ of contact of the pair of roller electrodes $20_U$, $20_S$ with the plate-like workpieces $12_H$, $12_M$ in the axial direction of the roller electrodes are equal to each other.

Figure 15:
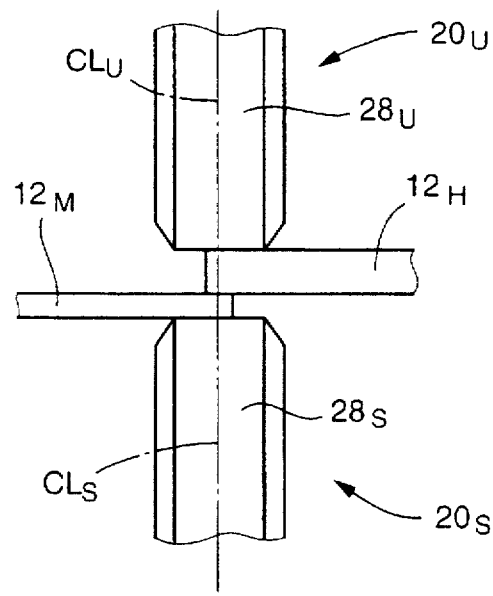
FIG. 15 is a view corresponding to that of FIG. 4, showing another embodiment of this invention.

FIG. 15 shows the pair of plate-like workpieces $12_H$, $12_S$ which are guided by guiding devices (guide rollers 14 and guide members $18_U$, $18_S$) and squeezed by the roller electrodes $20_U$, $20_S$, in another embodiment of this invention. In the embodiment shown in the figure, the outer circumferential contact surfaces $28_U$, $28_S$ of the pair of roller electrodes $20_U$, $20_S$ have the same width dimension. These roller electrodes $20_U$, $20_S$ are disposed such that the widthwise centerlines $CL_U$, $CL_S$ of the outer circumferential contact surfaces $28_U$, $28_S$ are substantially aligned with each other. The above-indicated guiding device (guide rollers 14 and guide members $18_U$, $18_S$) is constructed to guide the pair of plate-like workpieces $12_H$, $12_M$ such that the centerline of the lap width S of the overlapping edge portions of the pair of plate-like workpieces $12_H$, $12_M$, that is, the welding centerline A is substantially aligned with the widthwise centerlines $CL_U$, $CL_S$ of the pair of roller electrodes $20_U$, $20_S$. In the present embodiment, the drive motors 76 functioning as a driving device for driving the guide rollers 14 and retainer rollers 16 are arranged to rotate the guide rollers 14 and retainer rollers 16 so that the welding speed, namely, the peripheral speed of the roller electrodes $20_U$, $20_S$ is 20 m/min. or higher.

Figure 16:
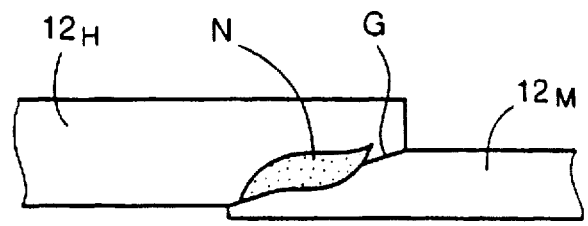
FIG. 16 is a view explaining the position at which a weld nugget is formed in the embodiment of FIG. 15.

In the present embodiment, the weld nugget N is formed obliquely along the interface G, as indicated in FIG. 16 by way of example. Accordingly, the nugget ratio $R_N$ is made large permitting a sufficient weld strength, even though the amount of mashing of the thick plate-like workpiece $12_H$ is not made larger than that of the thin plate-like workpiece $12_M$. This appears to be caused by the specific resistance of the plate-like workpieces $12_H$, $12_M$ which becomes higher than electrical contact resistance between the pair of roller electrodes $20_U$, $20_S$ and the plate-like workpieces $12_H$, $12_M$.

Figure 17:
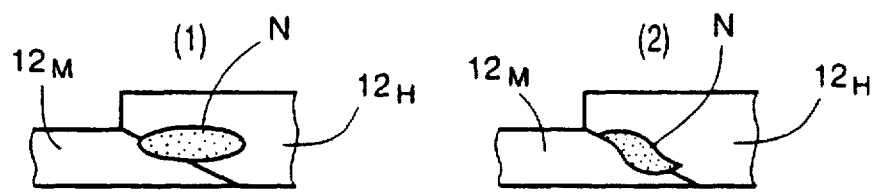
FIG. 17 is a view and a table indicating results of experiments conducted to confirm a range of welding speed in which the embodiment of FIG. 15 is effective.

FIG. 17 shows a relationship between the thickness ratio of the plate-like workpieces $12_H$, $12_M$ and the welding speed, which was obtained by experiments conducted by the present inventors in different conditions, each experiment consisting of ten test operations. In the figure, (1) indicates the case where the nugget ratio $R_N$ is lower than a desired value (40%), while (2) indicates the case where the nugget ratio $R_N$ is higher than the desired value (40%). It will be understood from the table of FIG. 17 that the nugget ratio $R_N$ does not reach the desired value even where the thickness ratio is 1.4 (1:1.4), when the welding speed is 10 m/min. or 15 m/min., while the nugget ratio $R_N$ reaches the desired value even where the thickness ratio is 2.0 (1.2.0), when the welding speed is 20 m/min.

Figure 18:
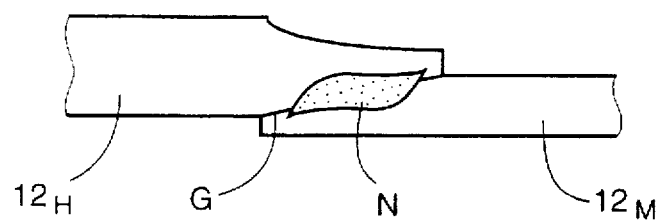
FIG. 18 is a view explaining the position at which a weld nugget is formed when the embodiment of FIGS. 1–9 and the embodiment of FIG. 15 are combined.

FIG. 18 shows the state of a weld when the welding speed is 20 m/min. or higher in the embodiment of FIGS. 1–9. In this case, the interface G is formed at a position intermediate between the pair of roller electrodes $20_U$, $20_S$, and the nugget N is formed obliquely along the interface G, whereby the nugget ratio $R_N$ is further increased, leading to an advantage of assuring a sufficient weld strength.

Figure 19:
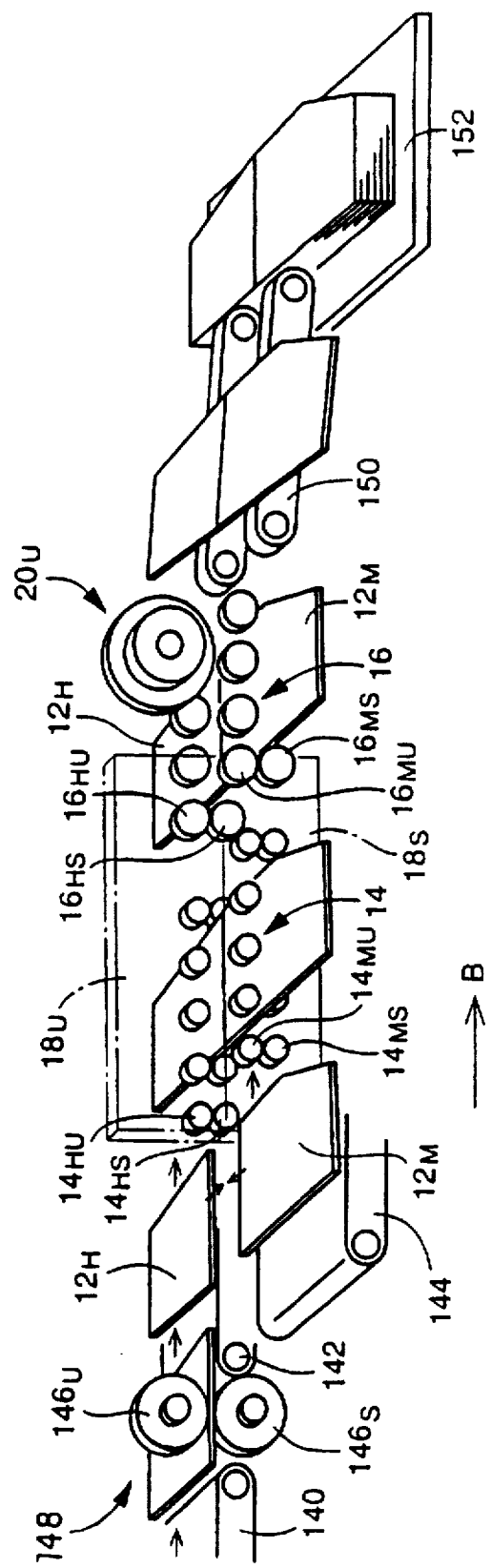
FIG. 19 is a perspective view explaining a preliminary treatment or a preliminary treatment device in another embodiment of this invention.

FIG. 19 shows an embodiment provided with a preliminary treatment device for performing a preliminary treatment step of mashing and thinning a welding portion or one edge portion of the thick workpiece $12_H$ prior to a welding operation. In the embodiment of FIG. 19, the pair of plate-like workpieces $12_H$, $12_M$ are guided relative to each other (Guiding Step) by a plurality of sets of guide rollers 14 and guide members $18_U$, $18_S$ functioning as a guiding device, in the same manner as in the preceding embodiments, such that the edge portions of the workpieces to be welded together overlap each other with a predetermined lap amount S, while the workpieces are fed in the predetermined feeding direction B by conveyors 140, 142, 144, guide rollers 14 and retainer rollers 16, which function as a work feeding device. Then, the overlapping edge portions of the thus positioned pair of plate-like workpieces $12_H$, $12_M$ are squeezed at the welding portion by the pair of upper and lower roller electrodes $20_U$, $20_S$, and are seam-welded (Welding Step) by application of a welding current between the roller electrodes $20_U$, $20_S$, along the welding centerline A which is parallel to the feeding direction B and which passes the widthwise center of the lap width S of the overlapping edge portions. The pairs of plate-like workpieces $12_H$, $12_M$ which have been welded together are unloaded by a conveyor 150 and placed in stack on a pallet 152.

In a feeding path along which the workpieces are fed as described above, there is provided a presser roller device 148 consisting of a pair of roller dies $146_U$, $146_S$ for squeezing and thinning the welding portion or edge portion of the thick plate-like workpiece $12_H$. The presser roller device 148 is disposed upstream of the roller electrodes $20_U$, $20_S$, guide rollers 14 and guide members $18_U$, $18_S$, that is, between the conveyors 140 and 142 provided exclusively for feeding the thick plate-like workpiece $12_H$. This presser roller device 148 functions as the preliminary treatment device for thinning the edge portion of the thick plate-like workpiece $12_H$ prior to the welding operation. In the mash seam welding apparatus according to the present embodiment, the thickness of the welding portion of the thick plate-like workpiece $12_H$ is reduced prior to the seam welding by the pair of roller electrodes $20_U$, $20_S$, so that the thickness difference of the welding portion of the thick plate-like workpiece $12_H$ with respect to the welding portion of the thin plate-like workpiece $12_M$ is reduced, whereby the weld nugget N formed at a position intermediate between the pair of roller electrodes $20_U$, $20_S$ extends across the interface G of the two plate-like workpieces $12_H$, $12_M$, permitting the weld to have a desired strength.

While the embodiments of this invention have been explained referring to the drawings, the invention may be otherwise embodied.

In the illustrated embodiments, the plate-like workpiece $12_H$ has a larger thickness than the plate-like workpiece $12_M$, the workpiece $12_M$ may have a thickness larger than the workpiece $12_H$. In this case, too, the surface area of contact of the thick plate-like workpiece with the corresponding roller electrode is made larger than that of the thin plate-like workpiece with the corresponding roller electrode.

While the illustrated embodiments are adapted to seam-weld the plate-like workpieces $12_H$, $12_M$ at their edge portions, the plate-like workpieces may be seam-welded at their portions located inwardly from the edge portions.

The embodiment of FIG. 18 is a combination of the embodiment of FIGS. 1–9 and the embodiment of FIG. 16. However, the present invention may be embodied as any combination of the embodiments selected from among the embodiment of FIGS. 1–9, embodiment of FIG. 12, embodiment of FIG. 13, embodiment of FIG. 16 and embodiment of FIG. 19.

While the illustrated embodiments are adapted to seam weld the pair of plate-like workpieces $12_H$, $12_M$ while the workpieces are fed in the horizontal direction, the seam welding may be effected while the workpieces are fed in the vertical direction.

Although the embodiment of FIG. 19 uses the presser roller device 148 provided with the pair of roller dies $146_U$, $146_S$ as the preliminary treatment device for thinning the edge portion of the thick plate-like workpiece $12_H$, the preliminary treatment device may be a grinding device for thinning the edge portion of the thick plate-like workpiece $12_H$ by grinding prior to the welding operation.

In the illustrated embodiments, the guide rollers 14 and the retainer rollers 16 include the lower guide rollers $14_{HS}$, $14_{MS}$ and the lower retainer rollers $16_{HS}$, $16_{MS}$ which are located below the plate-like workpieces $12_H$, $12_M$ and which are driven by the drive motors 76. However, the upper guide rollers $14_{HU}$, $14_{MU}$ and the upper retainer rollers $16_{HU}$, $16_{MU}$ are driven by the drive motors 76, or the upper and lower guide and retainer rollers are both driven by the drive motors 76.

While all of the guide rollers $14_{HS}$, $14_{MS}$ are driven by the drive motors 76 in the illustrated embodiments, only the selected ones of these guide rollers may be driven. In the case where the pair of plate-like workpieces $12_H$, $12_M$ can be sufficiently fed by a plurality of sets of guide rollers 14, the set of retainer rollers 16 in the embodiment of FIGS. 1–9 need not be driven.

Further, at least one of the pair of roller electrodes $20_U$, $20_S$ in the embodiment of FIGS. 1–9 may be driven by the electric motor 140 shown in FIG. 19, for example, at a peripheral speed equal to the feeding speed of the pair of plate-like workpieces $12_H$, $12_M$.

Further, at least one of the pair of roller electrodes $20_U$, $20_S$ in the embodiment of FIGS. 1–9 may be driven by a drive motor (not shown) at a peripheral speed equal to or higher than the feeding speed of the pair of plate-like workpieces $12_H$, $12_M$.

In the embodiment of FIGS. 1–9, the guide rollers 14 are inclined by a predetermined angle θ for pressing the pair of plate-like workpieces $12_H$, $12_M$ toward the guide members $18_U$, $18_S$ while the workpieces are fed. However, slant guiding plates may be provided for contact with the outer edges of the pair of plate-like workpieces $12_H$, $12_M$, such that the slant guiding plates approach the guide members $18_U$, $18_S$ as it extends in the feeding direction.

It is to be understood that the foregoing embodiments are provided for illustrative purpose only, and that various changes may be made in the illustrated embodiments, without departing from the spirit of the invention.

We claim:

1. A mash seam welding process of continuously welding a first plate-like workpiece and a second plate-like workpiece having a smaller thickness than said first plate-like workpiece, at overlapping portions of first and second plate-like workpieces, by applying a welding current between a pair of roller electrodes disposed rotatably about respective axes thereof, to thereby form a weld nugget at an interface of said overlapping portions while said overlapping portions are squeezed by said pair of roller electrodes, wherein an amount of mashing of said first plate-like workpiece by one of said pair of roller electrodes is made larger than that of said second plate-like workpiece by the other of said pair of roller electrodes.

2. A mash seam welding process according to claim 1 wherein a surface area of contact of said one roller electrode with said first plate-like workpiece is made smaller than a surface area of contact of said other roller electrode with said second plate-like workpiece.

3. A mash seam welding process according to claim 1, wherein a length of contact of said one roller electrode with said first plate-like workpiece in an axial direction of said pair of roller electrodes is made smaller than that of said other roller electrode with said second plate-like workpiece in said axial direction.

4. A mash seam welding process according to claim 1, wherein said one roller electrode located on the side of said first plate-like workpiece has a smaller diameter than said other roller electrode located on the side of said second plate-like workpiece.

5. A mash seam welding process of continuously welding a first plate-like workpiece and a second plate-like workpiece having a smaller thickness than said first plate-like workpiece, at overlapping portions of said first and second plate-like workpieces, by applying a welding current between a pair of roller electrodes disposed rotatably about respective axes thereof, to thereby form a weld nugget at an interface of said overlapping portions while said overlapping portions are squeezed by said pair of roller electrodes, said process comprising:

feeding a pair of plate-like workpieces at a speed of 20 m/min. or higher while said plate-like workpieces are squeezed by said pair of roller electrodes.

6. A mash seam welding process of continuously welding a first plate-like workpiece and a second plate-like workpiece having a smaller thickness than said first plate-like workpiece, at overlapping portions of said first and second plate-like workpieces, while said overlapping portions of said first and second plate-like workpieces are squeezed by a pair of roller electrodes disposed rotatably about respective two parallel axes thereof, said process comprising:

a welding step of continuously welding said first and second plate-like workpieces by applying a welding current between said pair of roller electrodes, to thereby form a weld nugget at an interface of said overlapping portions while said overlapping portions are squeezed by said pair of roller electrodes; and a preliminary treatment step of squeezing a welding portion of said first plate-like workpiece between upper and lower roller dies of a presser roller device thereby to reduce the thickness of said welding portion of said first plate-like workpiece, prior to said welding step.

7. A mash seam welding apparatus for continuously welding a first plate-like workpiece and a second plate-like workpiece having a smaller thickness than said first plate-like workpiece, at overlapping portions of said first and second plate-like workpieces, by applying a welding current between a pair of roller electrodes disposed rotatably about respective axes thereof, to thereby form a weld nugget at an interface of said overlapping portions while said overlapping portions are squeezed by said pair of roller electrodes, said mash seam welding apparatus comprising:

said pair of roller electrodes being biased toward each other and having a same diameter; and a guiding device for guiding said first and second plate-like workpieces such that said two plate-like workpieces overlap each other with a predetermined lap amount, while said first and second plate-like workpieces are fed toward said pair of roller electrodes, so that said overlapping portions of said first and second plate-like workpieces are squeezed by said pair of roller electrodes such that a surface area of contact of one of said pair of roller electrodes with said first plate-like workpiece is smaller than a surface area of contact of the other of said pair of roller electrodes with said second plate-like workpiece.

8. A mash seam welding process according to claim 7, wherein said guiding device guides said first and second plate-like workpieces such that a length of contact of said one roller electrode with said first plate-like workpiece in an axial direction of said pair of roller electrodes is smaller than that of said other roller electrode with said second plate-like workpiece in said axial direction.

9. A mash seam welding process according to claim 8, wherein said pair of roller electrodes have respective outer circumferential contact surfaces and are disposed such that widthwise centerlines of said outer circumferential contact surfaces are substantially aligned with each other, and wherein said guiding device guides said first and second plate-like workpieces such that an edge of said first plate-like workpiece is located between a widthwise end of said outer circumferential contact surface of said one roller electrode on the side of said first plate-like workpiece and said widthwise centerline of said outer circumferential contact surface of said one roller electrode, while an edge of said second plate-like workpiece is located at an widthwise end of said outer circumferential contact surface of said other roller electrode on the side of said first plate-like workpiece.

10. A mash seam welding apparatus according to claim 8, wherein said pair of roller electrodes have respective outer circumferential contact surfaces, respectively, and are disposed such that widthwise centerlines of said outer circumferential contact surfaces are offset from each other by a predetermined distance in an axial direction of said pair of roller electrodes, and wherein said guiding device guides said first and second plate-like workpieces such that a centerline of overlapping edge portions of said first and second plate-like workpieces is substantially aligned with said widthwise centerline of said outer circumferential contact surface of said one roller electrode.

11. A mash seam welding apparatus according to claim 8, wherein said pair of roller electrodes have respective outer circumferential contact surfaces, respectively, said outer circumferential contact surface of said one roller electrode located on the side of said first plate-like workpiece having a smaller width dimension than that of said outer circumferential contact surface of said other roller electrode located on the side of said second plate-like workpiece, said pair of roller electrodes being disposed such that widthwise centerlines of said outer circumferential contact surfaces are substantially aligned with each other, and wherein said guiding device guides said first and second plate-like workpieces such that a centerline of overlapping edge portions of said first and second plate-like workpieces is substantially aligned with said widthwise centerlines of said outer circumferential contact surfaces of said pair of roller electrodes.

12. A mash seam welding apparatus according to claim 7, wherein said one roller electrode located on the side of said first plate-like workpiece has a smaller diameter than said other roller electrode located on the side of said second plate-like workpiece.

13. A mash seam welding apparatus according to claim 7, further comprising a feeding device for feeding said first and second plate-like workpieces at a speed of 20 m/min. or higher while said first and second plate-like workpieces are squeezed by said first and second roller electrodes.

14. A mash seam welding apparatus for continuously welding a first plate-like workpiece ($12_H$) and a second plate-like workpiece ($12_M$) having a smaller thickness than said first plate-like workpiece, at overlapping portions of said first and second plate-like workpieces, by applying a welding current between a pair of roller electrodes (20) disposed rotatably about respective axes (C3) thereof, to thereby form a weld nugget (N) at an interface (G) of said overlapping portions while said overlapping portions are squeezed by said pair of roller electrodes, said mash seam welding apparatus comprising:

said pair of roller electrodes being biased toward each other and having a same diameter;

a guiding device for guiding said first and second plate-like workpieces such that said first and second plate-like workpieces overlap each other with a predetermined lap amount, while said first and second plate-like workpieces are fed toward said pair of roller electrodes, so that said overlapping portions of said first and second plate-like workpieces are squeezed by said pair of roller electrodes such that an amount of mashing of said first plate-like workpiece by one of said pair of roller electrodes is made larger than that of said second plate-like workpiece by the other of said pair of roller electrodes; and a feeding device for feeding said first and second plate-like workpieces at a speed of 20 m/min. or higher while said overlapping portions are squeezed by said pair of roller electrodes.

15. A mash seam welding apparatus for continuously welding a first plate-like workpiece and a second plate-like workpiece having a smaller thickness than said first plate-like workpiece, at overlapping portions of said first and second plate-like workpieces, while said overlapping portions of said first and second plate-like workpieces are squeezed by a pair of roller electrodes disposed rotatably about respective two parallel axes thereof, said mash seam welding apparatus comprising:

a work feeding device for feeding said first and second plate-like workpieces in a predetermined feeding direction;

a welding portion for continuously welding said first and second plate-like workpieces by applying a welding current between said pair of roller electrodes, to thereby form a weld nugget at an interface of said overlapping portions, while said first and second plate-like workpieces are fed by said work feeding device and squeezed by said pair of roller electrodes; and a preliminary treatment device comprising a presser roller device including upper and lower dies disposed upstream of said welding portion, for squeezing the portion of said first plate-like workpiece which overlaps said second plate-like workpiece, between said upper and lower roller dies thereby to reduce the thickness of said portion of said first plate-like workpiece.

* * * * *